Feb. 24, 1925.
F. P. BURKE
TWINE CUTTER
Filed July 29, 1922
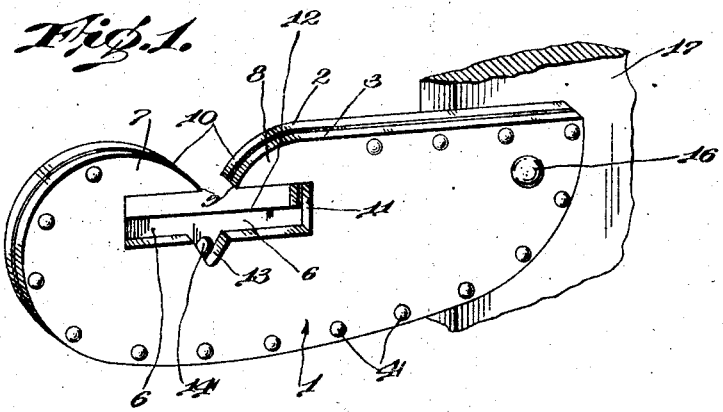
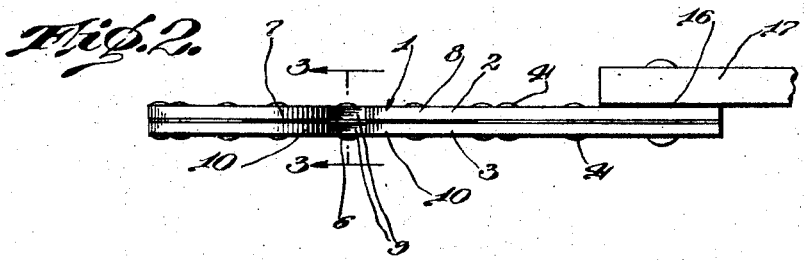
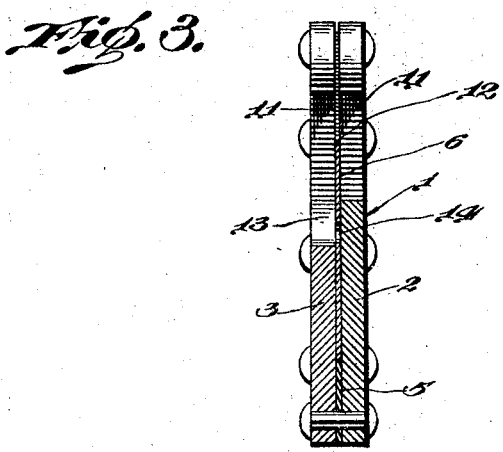

Patented Feb. 24, 1925.

1,527,835

UNITED STATES PATENT OFFICE.

FRANK P. BURKE, OF CHICAGO, ILLINOIS.

TWINE CUTTER.

Application filed July 29, 1922. Serial No. 578,378.

*To all whom it may concern:*

Be it known that I, FRANK P. BURKE, a citizen of the United States, residing at Chicago, in the county of Cook and State of Illinois, have invented new and useful Improvements in Twine Cutters, of which the following is a specification.

This invention relates to twine cutters particularly designed for use in post offices, department stores and analogous places, and an object of the invention is to provide a twine cutter which will not only save time in the tying up of packages, but will also save the fingers of the user and will result in a considerable savings in the twine used.

It is the present practice, to wind the twine about the package and then break the twine from the ball with the fingers leaving loose useless ends of from two to three inches and sometimes even longer upon the package and where several packages are tied, this causes considerable waste of twine or string and it also requires a much longer time to twist the twine about the fingers of the person tying up the package and then breaking the twine than it would to slip the twine over the improved cutter which is the subject matter of the present specification.

Another object of the invention is to provide a twine cutter which is designed for using safety razor blades as the cutting medium and which embodies a suitable carrier which has guarding and twine guiding projections thereon for preventing the fingers of the user from coming in contact with the cutting edge, and also for guiding the twine to the cutting edge to permit quick and easy cutting of the twine.

Other objects of the invention will appear in the following detailed description taken in connection with the accompanying drawing wherein:

Fig. 1 is a perspective view of the improved twine cutter.

Fig. 2 is a top plan of the twine cutter.

Fig. 3 is a section on the line 3—3 of Fig. 2.

Referring more particularly to the drawings, the improved twine cutter comprises a body 1 which is constructed of plates 2 and 3 formed of any suitable material, preferably smooth shoe sole leather. The plates 2 and 3 are identical in shape, and are connected by rivets or any suitable fastening means as indicated at 4, being held in spaced relation by a liner 5 of any suitable material, so as to space the plates 2 and 3 a sufficient distance apart to permit them to receive the cutting blade 6 therebetween. The line 5 is cut out to provide a pocket for receiving the blade 6, and to provide an entrance to the pocket through the twine guiding guards 7 and 8. The twine guiding guards 7 and 8 have their innermost edges 9 spaced the proper distance apart to permit twine to be quickly passed over their rounded upper edges 10 into the substantially rectangular opening 11 formed in the body 1 and to permit the twine to be passed over the cutting edge 12 of the plate 6 for cutting the twine. The plate 3 is provided with a substantially V shaped recess 13 cut therein intermediate the ends of the opening 11 and extending inwardly from the inner side edge of the opening so as to permit any suitable instrument to be inserted in the opening 14 formed in the plate 6 to permit proper adjustment or positioning of the blade in the body or to permit the removal of the blade from the body for replacing it with another blade. It is to be understood, they being particularly adaptable for this purpose.

The upper edge of the body 1 extends in a straight line from the terminal of the curved surface of the guard 8, to the inner end of the body, as clearly shown in Fig. 1 of the drawings while the lower edge of the body is curved throughout its entire length, the curvature of the outer end of the body merging into the curvature of the curved surface 10 of the guard 7, as clearly shown in Fig. 1 of the drawings, thereby providing a curved convex leading surface for leading or guiding the twine through the space 9 upon the cutting edge 12 permitting the user to quickly move the twine into position for cutting and cut the twine without requiring particular skill or attention to the cutter.

The body 1 is provided with a suitable pivot receiving opening near its inner end through which a suitable pivot pin or bolt 16 may extend for pivotally connecting the twine cutter to a support as shown at 17 and to permit the twine cutter to be swung back out of position when not in use.

By reference to Fig. 3 of the drawings, it will be noted that the plates 2 and 3 are of sufficient thickness so as to prevent the user of the cutter from bringing portions of his fingers in contact with the cutting edge, and also that the space 9 is restricted in width so as to prevent a portion of the finger of the user from passing through this opening and engaging the cutting edge 12 thereby eliminating liability of accidentally cutting the fingers of the user.

It is, of course, to be understood that the invention may be constructed in other manners and the parts associated in different relations and, therefore, I do not desire to be limited in any manner except as set forth in the claims hereunto appended.

Having thus described my invention what I claim is:

1. A twine cutter including spaced plates, having an opening therethrough, guards extending over the upper edge of the opening and having their inner ends in spaced relation, a cutting blade having an opening, a liner between the plates to maintain them in spaced relation and having a recess in one edge thereof to receive the cutting blade and assist in maintaining said blade in operative position between the plates and beneath the guards, yet permit removal of said blade and a V-shaped notch in the lower edge of the opening in the plates in alignment with the opening in the blade.

2. A twine cutter including spaced plates, a liner between the plates to maintain them in spaced relation, a cutting blade, said liner having a recess in one edge thereof to receive the blade and permit removal of the same, said plates having a transverse opening therethrough exposing a portion of the blade, a V-shaped notch in the lower edge of the opening, the cutting blade having an opening in alignment with the notch, guards extending over the upper edge of the opening and having their inner ends arranged in spaced relation to provide a passage and the upper edges of the guards being rounded whereby to guide a cord or the like through the passage on to the cutting blade.

In testimony whereof I affix my signature.

FRANK P. BURKE.